United States Patent
Short

(10) Patent No.: US 8,082,966 B2
(45) Date of Patent: Dec. 27, 2011

(54) SYSTEM FOR ENHANCING SONOTRODE PERFORMANCE IN ULTRASONIC ADDITIVE MANUFACTURING APPLICATIONS

(75) Inventor: Matthew A. Short, Grove City, OH (US)

(73) Assignee: Edison Welding Institute, Inc., Columbus, OH (US)

( * ) Notice: Subject to any disclaimer, the term of this patent is extended or adjusted under 35 U.S.C. 154(b) by 111 days.

(21) Appl. No.: 12/723,312

(22) Filed: Mar. 12, 2010

(65) Prior Publication Data
US 2011/0220292 A1    Sep. 15, 2011

(51) Int. Cl.
*B32B 37/00* (2006.01)
(52) U.S. Cl. ................... 156/580.2; 156/580.1
(58) Field of Classification Search ............... 156/73.1, 156/555, 580, 580.1, 580.2, 582
See application file for complete search history.

(56) References Cited

U.S. PATENT DOCUMENTS

| | | | |
|---|---|---|---|
| 3,955,740 A | | 5/1976 | Shoh |
| 5,707,483 A | * | 1/1998 | Nayar et al. ............... 156/580.2 |
| 5,730,832 A | | 3/1998 | Sato |
| 5,772,100 A | | 6/1998 | Patrikios |
| 5,976,316 A | | 11/1999 | Mlinar et al. |
| 6,547,903 B1 | * | 4/2003 | McNichols et al. ............ 156/64 |
| 6,613,171 B2 | * | 9/2003 | McNichols et al. ......... 156/73.1 |
| 6,786,384 B1 | | 9/2004 | Haregoppa |
| 7,243,894 B2 | * | 7/2007 | Haregoppa et al. ........... 248/638 |

OTHER PUBLICATIONS

International Search Report and Written Opinion received in PCT/US2011/027814, mailed Nov. 3, 2011.

* cited by examiner

*Primary Examiner* — James Sells
(74) *Attorney, Agent, or Firm* — McNees Wallace & Nurick, LLC

(57) ABSTRACT

An ultrasonic welding assembly, comprising: a sonotrode having a single welding region and two nodal regions formed on either side of the welding region; a mounting plate for supporting the sonotrode having a force application region on the upper surface thereof; at least one ultrasonic transducer connected to the sonotrode; at least one diaphragm spring disposed between the ultrasonic transducer and the sonotrode; at least one roller bearing connected to the diaphragm spring; at least two linear guides connected to the roller bearing, wherein the at least two linear guides are connected to the mounting plate and support the roller bearing and the sonotrode in a flexible manner; and first and second low-friction linear bearings in contact with nodal regions for the application of downward force to the sonotrode, wherein the first and second linear bearings are connected to the mounting plate.

20 Claims, 3 Drawing Sheets

SYSTEM FOR ENHANCING SONOTRODE PERFORMANCE IN ULTRASONIC ADDITIVE MANUFACTURING APPLICATIONS

STATEMENT REGARDING FEDERALLY SPONSORED RESEARCH

This invention was made with support under Contract No. DAAD19-03-2-0002 awarded by the U.S. Army. The U.S. Government has certain rights in the invention.

BACKGROUND OF THE INVENTION

The described invention relates in general to ultrasonic welding systems and more specifically to a device and method for enhancing the performance of sonotrodes used in ultrasonic additive manufacturing applications.

Ultrasonic welding is an industrial process involving high-frequency ultrasonic acoustic vibrations that are locally applied to workpieces being held together under pressure to create a solid-state weld. This process has applications in the electrical/electronic, automotive, aerospace, appliance, and medical industries and is commonly used for plastics and especially for joining dissimilar materials. Ultrasonic welding of thermoplastics results in local melting of the plastic due to absorption of vibration energy. The vibrations are introduced across the joint to be welded. In metals, ultrasonic welding occurs due to high-pressure dispersion of surface oxides and local motion of the materials. Although there is heating, it is not enough to melt the base materials. Vibrations are introduced along the joint being welded.

Ultrasonic welding systems typically include the following components: (i) a press to apply pressure to the two parts to be assembled under pressure; (ii) a nest or anvil where the parts are placed for allowing high frequency vibration to be directed to the interfaces of the parts; (iii) an ultrasonic stack that includes a converter or piezoelectric transducer for converting the electrical signal into a mechanical vibration, an optional booster for modifying the amplitude of the vibration (it is also used in standard systems to clamp the stack in the press), and a sonotrode or horn for applying the mechanical vibration to the parts to be welded (note: all three components of the stack are specifically tuned to resonate at the same exact ultrasonic frequency which is typically 20, 30, 35 or 40 kHz); (iv) an electronic ultrasonic generator or power supply delivering a high power AC signal with frequency matching the resonance frequency of the stack; and (v) a controller for controlling the movement of the press and the delivery of the ultrasonic energy.

In an exemplary system, the power supply provides high-frequency electrical power to the piezoelectric-based transducer, creating a high-frequency mechanical vibration at the end of the transducer. This vibration is transmitted through the booster section, which may be designed to amplify the vibration, and is then transmitted to the sonotrode, which transmits the vibrations to the workpieces. The workpieces, usually two thin sheets of metal in a simple lap joint, are firmly clamped between the sonotrode and a rigid anvil by a static force. The top workpiece is gripped against the moving sonotrode by a knurled pattern on the sonotrode surface. Likewise, the bottom workpiece is gripped against the anvil by a knurled pattern on the anvil. The ultrasonic vibrations of the sonotrode, which are parallel to the workpiece surfaces, create the relative frictionlike motion between the interface of the workpieces, causing the deformation, shearing, and flattening of surface asperities. Welding system components, commonly referred to as the transmission line or "stack" are typically housed in an enclosure case that grips the welding assembly at critical locations (most commonly the anti-node) so as to not dampen the ultrasonic vibrations, and to provide a means of applying a force to and moving the assembly to bring the sonotrode into contact with the workpieces and apply the static force.

A number of parameters can affect the welding process, such as ultrasonic frequency, vibration amplitude, static force, power, energy, time, materials, part geometry, and tooling. With regard to tooling, which includes the sonotrode, welding tip, and the anvil, these components support the parts to be welded and transmit ultrasonic energy and static force. The welding tip is usually machined as an integral part of a solid sonotrode. The sonotrode is exposed to ultrasonic vibration and resonates in frequency as "contraction" and "expansion" x times per second, with x being the frequency. The amplitude is typically a few micrometers (about 13 to 130 m). The shape of the sonotrode (round, square, with teeth, profiled, etc), depends on the quantity of vibratory energy and a physical constraint for a specific application. Sonotrodes are made of titanium, aluminum or steel. For an ultrasonic welding application, the sonotrode provides energy directly to the welding contact area, with little diffraction. This is particularly helpful when vibrations propagation could damage surrounding components.

Ultrasonic additive manufacturing (UAM) is an additive manufacturing technique based on the ultrasonic welding of metal foils and computer numerically controlled (CNC) contour milling. UAM can also be characterized as a solid-state metal deposition process that allows build-up or net-shape fabrication of metal components. High-frequency (typically 20,000 hertz) ultrasonic vibrations are locally applied to metal foil materials, held together under pressure, to create a solid-state weld. CNC contour milling is then used to create the required shape for the given layer. This process is then repeated until a solid component has been created or a feature is repaired or added to a component. UAM can join dissimilar metal materials of different thicknesses and allow for the embedment of fiber materials at relatively low temperature, (typically <50% of the metal matrix melting temperature) and pressure into solid metal matrices.

Current UAM technology utilizes titanium based tools which tend to wear rapidly, often resulting in a loss of displacement of the target media due to insufficient interaction of worn texture profiles during the ultrasonic welding process. Deflection of the sonotrode and loss of displacement under various forces can significantly affect the bond quality of build-ups of metal components during the UAM process. Incorporation of advanced tool steels into modified sonotrode designs would permit higher, more uniform stress distribution in the system, thereby allowing higher static forces to be applied to advanced materials while retaining critical surface texturing over extended periods of time. Therefore, there is a need for a sonotrode design that assists the UAM welding process by generating higher static forces required for transmitting increased levels of ultrasonic energy useful for producing components that include Ni, Ti, or high speed steel (HSS).

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, an ultrasonic welding assembly is provided. This ultrasonic welding assembly includes a sonotrode, wherein the sonotrode further includes a single welding region and two nodal regions formed on either side of the welding region; a mounting plate for supporting the sonotrode, wherein the mounting place further includes a force application region on the upper surface thereof; at least one ultrasonic transducer connected to the sonotrode; at least one diaphragm spring disposed between the ultrasonic transducer and the sonotrode; at least one roller bearing connected to the diaphragm spring; at least two linear guides connected to the roller bearing, wherein the at least two linear guides are connected to the mounting plate and support the roller bearing and the sonotrode in a flexible manner; and first and second low-friction linear bearings in contact with nodal regions on either side of the welding region of the sonotrode for the application of force thereto, wherein the first and second linear bearings are connected to the mounting plate.

In accordance with another aspect of the present invention, an ultrasonic welding device is provided. This ultrasonic welding device includes a sonotrode, wherein the sonotrode further includes a single welding region and two nodal regions formed on either side of the welding region; a mounting plate for supporting the sonotrode, wherein the mounting place further includes a force application region on the upper surface thereof; two ultrasonic transducers connected to the sonotrode, one on each side thereof; at least one diaphragm spring disposed between each ultrasonic transducer and the sonotrode; at least one roller bearing connected to each diaphragm spring; at least two linear guides connected to each roller bearing, wherein the at least two linear guides are connected to the mounting plate and support each roller bearing and the sonotrode in a flexible manner; and first and second low-friction linear bearings in contact with nodal regions on either side of the welding region of the sonotrode for the application of force thereto, wherein the first and second linear bearings are connected to the mounting plate.

In yet another aspect of this invention, an ultrasonic welding device for use in ultrasonic additive manufacturing is provided. This ultrasonic welding device includes a sonotrode, wherein the sonotrode further includes a single welding region and two nodal regions formed on either side of the welding region; a mounting plate for supporting the sonotrode, wherein the mounting place further includes a force application region on the upper surface thereof; two ultrasonic transducers connected to the sonotrode, one on each side thereof; at least one diaphragm spring disposed between each ultrasonic transducer and the sonotrode; at least one roller bearing connected to each diaphragm spring; at least two linear guides connected to each roller bearing, wherein the at least two linear guides are connected to the mounting plate and support each roller bearing and the sonotrode in a flexible manner; first and second linear bearings in contact with nodal regions on either side of the welding region of the sonotrode for the application of force thereto, wherein the first and second linear bearings are connected to the mounting plate; and a brush mount unit connected to each ultrasonic transducer, wherein each brush mount unit is also connected to the mounting plate.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
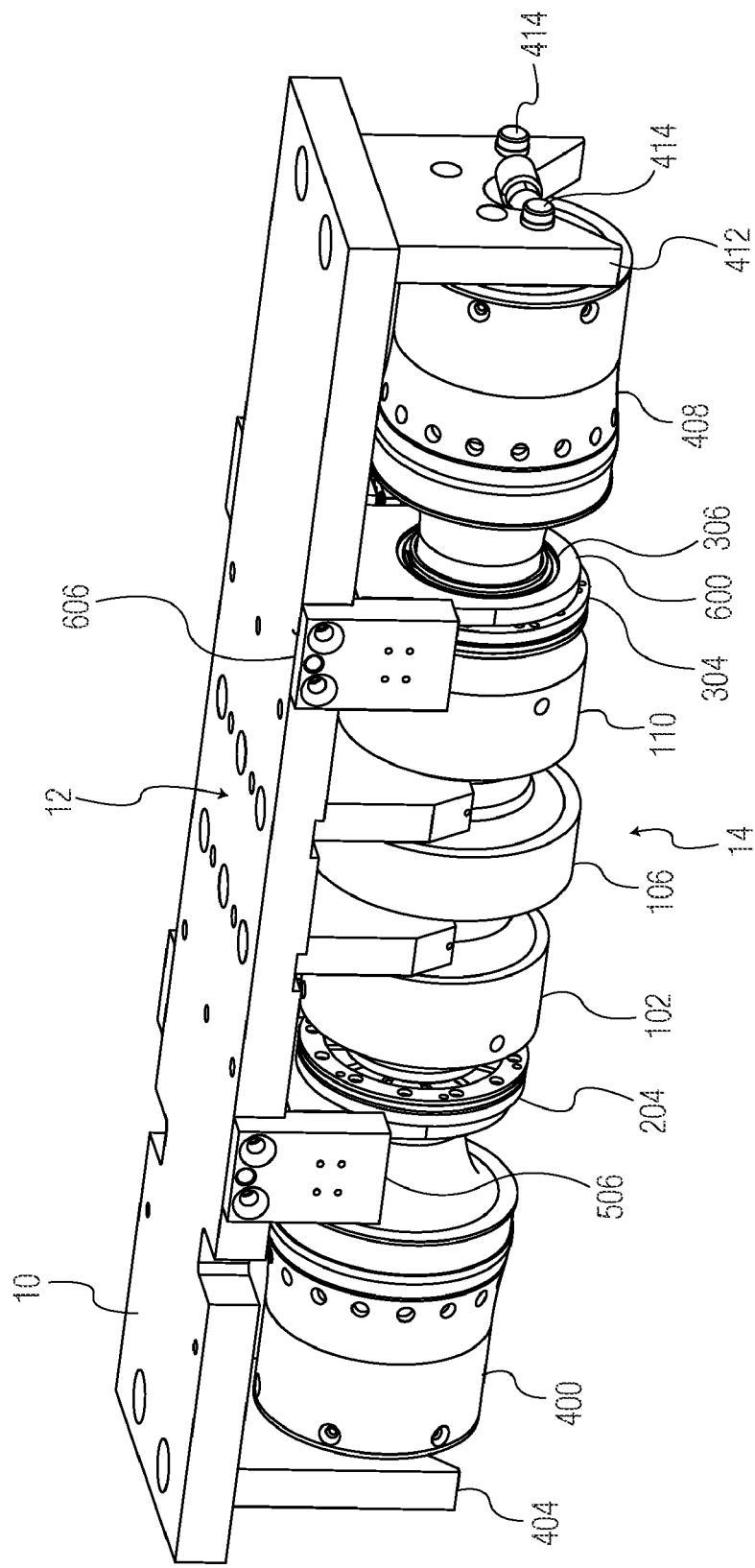
FIG. 1 is a perspective view of an exemplary embodiment of the ultrasonic welding assembly of the present invention showing the sonotrode and the various mounting features used therewith for connecting the sonotrode to the ultrasonic transducers and to the mounting plate.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates to an advanced tool design that increases or enhances the performance of sonotrodes used in ultrasonic additive manufacturing (UAM) processes for metals, plastics, and textiles. More specifically, this invention provides more efficient energy transmission to the materials interface creating a superior weld and greatly increases the strength of the final product. Additionally, the present invention may reduce the linear void density of the final product from the 30-40% of prior art systems to less than 1%. As previously indicated, a first general embodiment of this invention provides an ultrasonic welding assembly; a second general embodiment of this invention provides an ultrasonic welding device; and a third general embodiment of this invention provides an ultrasonic welding device for use in ultrasonic additive manufacturing. With reference now to the Figures, one or more specific embodiments of this invention shall be described in greater detail.

Figure 2:
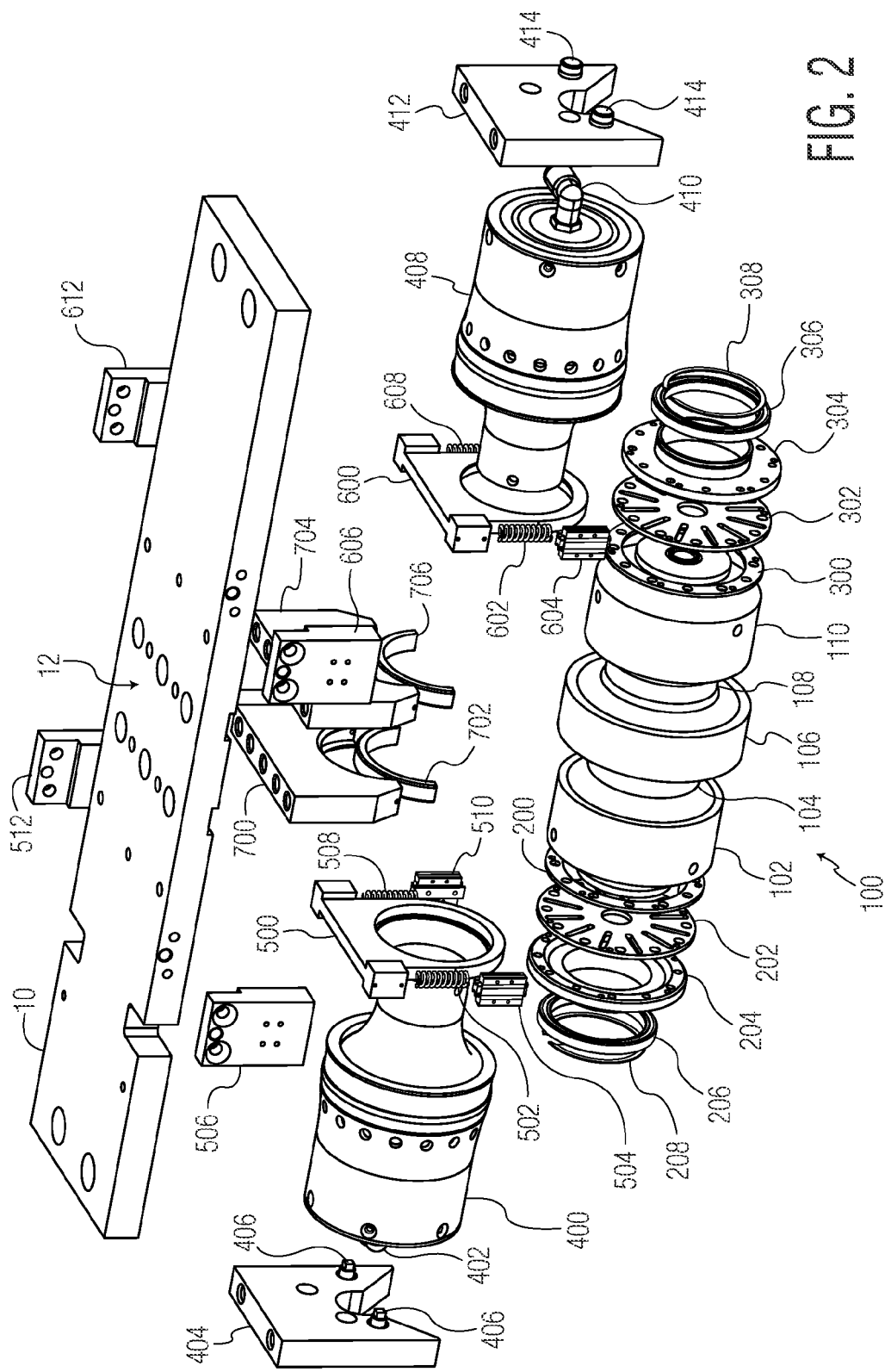
FIG. 2 is an exploded perspective view of the assembly of FIG. 1.
Figure 3:
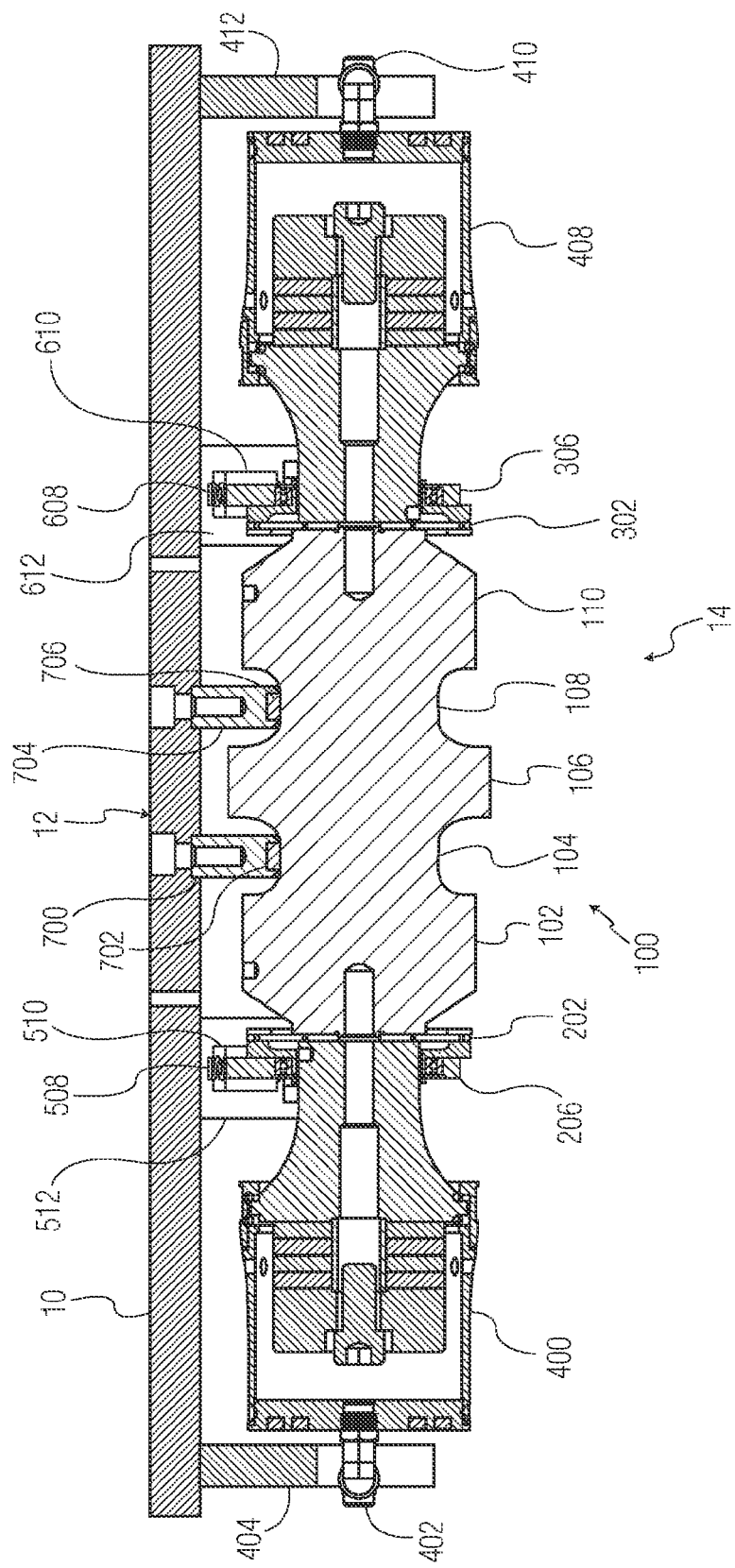
FIG. 3 is a cross-sectional side view of the assembly of FIG. 1.

FIGS. 1-3 illustrate an exemplary embodiment of this invention that includes module mounting plate 10, having a force application region 12 formed thereon where a press or the like is attached or connected for applying downward force to welding assembly 14. Full wave sonotrode 100 includes first body portion 102, first nodal region 104, textured welding surface 106, second nodal region 108 and second body portion 110. First spring clamp plate 200 is connected to first body portion 102 and first diaphragm spring 202 is connected to first spring clamp plate 200. First diaphragm spring mount 204 is connected to first diaphragm spring 202. First floating roller bearing 206 is connected to first diaphragm spring mount 204 (by way of first support ring 500, which acts as a housing for roller bearing 206) and first retaining ring 208 is connected to first floating roller bearing 206. Second spring clamp plate 300 is connected to second body portion 110 and second diaphragm spring 302 is connected to second spring clamp plate 300. Second diaphragm spring mount 304 is connected to second diaphragm spring 302. Second floating roller bearing 306 is connected to second diaphragm spring mount 304 (by way of second support ring 600, which acts as a housing for second roller bearing 306) and second retaining ring 308 is connected to second floating roller bearing 306.

Connecting diaphragm springs 202 and 302 to support rings 500 and 600 respectively, permits sonotrode 100 to rotate. Connecting support rings 500 and 600 to linear guides 504, 510, 604 and 610, as described below provides an additional degree of freedom for allowing welding assembly 14 to deflect under substantial loads. The floating diaphragm spring system of the present invention allows an ultrasonic transmission line to be subjected to extremely high loads, and at the same time, allows the system to rotate at variable speeds and operate in a resonant mode with minimal power consumption. Previous UAM systems where limited to soft metals and plastic due to system limitations that prevented adequate forces from being applied to the workpiece.

As shown in FIGS. 2 and 3, first transducer 400 is connected to first retaining ring 208. First transducer 400 includes first air fitting 402. First brush mount unit 404 is connected to first transducer 400 and includes electrical brush mount contacts 406. First brush mount unit 404 is also connected to mounting plate 10 for supporting a portion welding assembly 14. Second transducer 408 is connected to second retaining ring 308. Second transducer 408 includes second air fitting 410. Second brush mount unit 412 is connected to second transducer 408 and includes electrical brush mount contacts 414. Second brush mount unit 412 is also connected to mounting plate 10 for supporting a portion welding assembly 14.

First floating roller bearing 206 is encircled by and enclosed in first support ring 500. As best shown in FIG. 2, first biasing member or spring 502 is disposed between first support ring 500 and first linear guide 504. First linear guide 504 is connected to first spring seat mount 506, which is connected directly to mounting plate 12 (see FIG. 1). Second biasing member or spring 508 is disposed between first support ring 500 and second linear guide 510. Second linear guide 510 is connected to second spring seat mount 512, which is connected directly to mounting plate 12. Second floating roller bearing 306 is encircled by and enclosed in second support ring 600. As best shown in FIG. 2, third biasing member or spring 602 is disposed between second support ring 600 and third linear guide 604. Third linear guide 604 is connected to third spring seat mount 606, which is connected directly to mounting plate 12 (see FIG. 1). Fourth biasing member or spring 608 is disposed between second support ring 600 and fourth linear guide 610. Fourth linear guide 610 is connected to fourth spring seat mount 612, which is connected directly to mounting plate 12.

As best shown in FIGS. 2-3, first bearing support housing 700 is connected directly to mounting plate 12 and first low-friction bearing 702. Second bearing support housing 704 is also connected to mounting plate 12 and directly to second low-friction bearing 706. Support housings 700 and 704 distribute forces to the nodal regions of sonotrode 100. First low-friction bearing 702 is mounted directly over first nodal region 102 on sonotrode 100 and second low-friction bearing 706 is mounted directly over second nodal region 108 on sonotrode 100, both in a free state. Low-friction bearings 702 and 706 include various known specialty coatings, making them low-friction or reduced-friction in nature. Unlike more conventional systems that use diaphragm springs to support, locate, and apply force to the materials being welded, force is applied in the present invention through low-friction bearings 702 and 706. These low friction bearings, which may also be referred to as static bearings or force transmission bearing, permit transmission of ultrasonic vibrations while exerting high loads on materials while the materials are subjected the rotary motion of sonotrode 100. This is particularly advantageous because while some prior art designs permit application of forces to the nodal position, they do not permit rotation, and in some cases require higher power levels to maintain resonance. The low-friction bearing 702 and 706 allow for the application of extremely high forces with an extremely low coefficient of friction, thereby permitting the entire stack to go into resonance at low power levels while also rotating. Upon the application of ultrasonic energy, vibrations are applied to the supporting regions which allows for smooth rotation due to the friction reduction phenomena associated with ultrasonic vibrations.

With regard to proper functioning of the present invention, two aspects of the described system are of particular importance with regard to achieving optimal performance of a very high power UAM welding module, i.e., allowing for movement of the anti-resonant regions while maintaining positional alignment.

First is the ability to transmit acoustical vibrations through a sonotrode as it is being subjected to extremely high loads. In the exemplary embodiment of the present invention, force is transmitted directly to the nodal region of the sonotrode closest to the working surface giving the least amount of deflection. "Low-friction" bearing coatings permit lower start-up power requirements for achieving system resonance. This coating material significantly reduces the contact friction between the tooling applying the force and sonotrode 100. This is an important aspect because the sonotrode should transmit vibrations which in turn create displacement. If these surfaces were fully constrained, more power would be required to put the system in motion. Sonotrodes that transmit longitudinal vibrations undergo natural lateral expansion and contraction arising from the Poisson effect (see "*Introduction to High Power Ultrasonics*, Graff, Chapter 2, section 2.2.4, FIG. 2.12). The present invention utilizes reduced friction bearing surfaces which require lower power to break free from static friction and makes use of radial vibrations caused by this expansion and contraction feature. This effect creates intermittent contact at the regions of force application. As a result, reduction of frictional forces at the bearing surfaces (or force applied regions) is achieved. As stated, the coated bearing surfaces apply high forces up to 7,000-lbs. However, due to the specialty coatings (e.g., Frelon), the system requires minimal start up power to break free from the static friction at the interface. As the system goes into resonance, the Poisson effect generates an even higher friction reduction state since there is high frequency intermittent contact at the nodal region.

Second, a mounting mechanism in the form of a positional attachment device is provided to facilitate the proper functioning of the components described in the previous paragraph. Due to the forces exerted on sonotrode 100 during operation of the present invention, there will be inherent deflection in the system which must be considered to avoid the need for additional power to achieve resonance. In the exemplary embodiment, diaphragm springs 202 and 302 are connected to low-friction roller bearings 206 and 306 that are bolted to linear guides 504, 510, 604 and 610 which permit deflection in the Z-axis (i.e., downward). In this manner, sonotrode 100 "floats" under high loads without dampening acoustical vibrations. Since the system is permitted to float, or move where needed, the energy required to put the system in resonance is minimal, and output energy is more correctly distributed to the sonotrode's interface. This design permits operation at extremely high loads such as 5,000-lbs while transmitting high power vibrations in the order of 10-kW or 5-kW per transducer. The second function of diaphragm springs 202 and 302, acting in combination with linear guides 504, 510, 604 and 610 is to provide accurate and repeatable placement of the welding surface. Diaphragm springs 202 and 302 provide motion in the Z-axis. Moreover, the rigid constraint provided by low friction roller bearings 702 and 706 and linear guides 504, 510, 604 and 610 provide accurate positioning in both the X- and Y-axis. Thus, while linear guides 504, 510, 604 and 610 facilitate accurate positioning, roller bearings 206 and 306 allow for substantially continuous rotary motion. Furthermore, diaphragm springs 202 and 302 are not used to apply a load, but rather their inclusion allows for deflection of sonotrode 100 while exerting extremely high forces at welding surface 106. The present invention permits higher loads, e.g., increased from 400 to 7000 lbs, and ultrasonic energy levels increased from 1 kW to 9 kW are used to improve bonding and consolidation of deposited base materials. Additionally, the present invention provides preheating to soften the base materials to be bonded to allow bonding of higher-strength materials than would be feasible with prior art systems.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept. For example, in one embodiment of this invention, unique sonotrode textures are used achieve enhanced transmission of the high vibration energy from the sonotrode to the base material to be welded. Other modifications are possible.

What is claimed:

1. An ultrasonic welding assembly, comprising:
   (a) a sonotrode, wherein the sonotrode further includes a single welding region and two nodal regions formed on either side of the welding region;
   (b) a mounting plate for supporting the sonotrode, wherein the mounting place further includes a force application region on the upper surface thereof;
   (c) at least one ultrasonic transducer connected to the sonotrode;
   (d) at least one diaphragm spring disposed between the ultrasonic transducer and the sonotrode;
   (e) at least one roller bearing connected to the diaphragm spring;
   (f) at least two linear guides connected to the roller bearing, wherein the at least two linear guides are connected to the mounting plate and support the roller bearing and the sonotrode in a flexible manner; and
   (g) first and second low-friction linear bearings in contact with nodal regions on either side of the welding region of the sonotrode for the application of force thereto, wherein the first and second linear bearings are connected to the mounting plate.

2. The assembly of claim 1, further comprising a brush mount unit connected to the ultrasonic transducer, wherein the brush mount unit is also connected to the mounting plate.

3. The assembly of claim 1, further comprising a spring clamp plate connected to one side of the diaphragm spring and a diaphragm spring mount connected to the other side of the diaphragm spring.

4. The assembly of claim 1, further comprising a retaining ring mounted between the roller bearing and the ultrasonic transducer.

5. The assembly of claim 1, further comprising a support ring, wherein the support ring encircles the roller bearing, and wherein the support ring is connected to the mounting plate.

6. The assembly of claim 5, further comprising a biasing member mounted between the support ring and each linear guide.

7. The assembly of claim 1, further including a bearing support housing disposed between each linear bearing and the mounting plate and connected to the mounting plate.

8. An ultrasonic welding device, comprising
   (a) a sonotrode, wherein the sonotrode further includes a single welding region and two nodal regions formed on either side of the welding region;
   (b) a mounting plate for supporting the sonotrode, wherein the mounting place further includes a force application region on the upper surface thereof;
   (c) two ultrasonic transducers connected to the sonotrode, one on each side thereof;
   (d) at least one diaphragm spring disposed between each ultrasonic transducer and the sonotrode;
   (e) at least one roller bearing connected to each diaphragm spring;
   (f) at least two linear guides connected to each roller bearing, wherein the at least two linear guides are connected to the mounting plate and support each roller bearing and the sonotrode in a flexible manner; and
   (g) first and second low-friction linear bearings in contact with nodal regions on either side of the welding region of the sonotrode for the application of force thereto, wherein the first and second linear bearings are connected to the mounting plate.

9. The device of claim 8, further comprising a brush mount unit connected to each ultrasonic transducer, wherein each brush mount unit is also connected to the mounting plate.

10. The device of claim 8, further comprising a spring clamp plate connected to one side of each diaphragm spring and a diaphragm spring mount connected to the other side of each diaphragm spring.

11. The device of claim 8, further comprising a retaining ring mounted between each roller bearing and each ultrasonic transducer.

12. The device of claim 8, further comprising a support ring, wherein the support ring encircles the roller bearing, and wherein the support ring is connected to the mounting plate.

13. The device of claim 12, further comprising a biasing member mounted between the support ring and each linear guide.

14. The device of claim 8, further including a bearing support housing disposed between each linear bearing and the mounting plate.

15. An ultrasonic welding device for use in ultrasonic additive manufacturing, comprising
   (a) a sonotrode, wherein the sonotrode further includes a single welding region and two nodal regions formed on either side of the welding region;
   (b) a mounting plate for supporting the sonotrode, wherein the mounting place further includes a force application region on the upper surface thereof;
   (c) two ultrasonic transducers connected to the sonotrode, one on each side thereof;

(d) at least one diaphragm spring disposed between each ultrasonic transducer and the sonotrode;

(e) at least one roller bearing connected to each diaphragm spring;

(f) at least two linear guides connected to each roller bearing, wherein the at least two linear guides are connected to the mounting plate and support each roller bearing and the sonotrode in a flexible manner;

(g) first and second linear bearings in contact with nodal regions on either side of the welding region of the sonotrode for the application of downward force thereto, wherein the first and second linear bearings are connected to the mounting plate; and (h) a brush mount unit connected to each ultrasonic transducer, wherein each brush mount unit is also connected to the mounting plate.

16. The device of claim 15, further comprising a brush mount unit connected to each ultrasonic transducer, wherein each brush mount unit is also connected to the mounting plate.

17. The device of claim 15, further comprising a spring clamp plate connected to one side of each diaphragm spring and a diaphragm spring mount connected to the other side of each diaphragm spring.

18. The device of claim 15, further comprising a retaining ring mounted between each roller bearing and each ultrasonic transducer.

19. The device of claim 15, further comprising a support ring, wherein the support ring encircles the roller bearing, and wherein the support ring is connected to the mounting plate.

20. The device of claim 19, further comprising a biasing member mounted between the support ring and each linear guide.

* * * * *

UNITED STATES PATENT AND TRADEMARK OFFICE
CERTIFICATE OF CORRECTION

| | | |
|---|---|---|
| PATENT NO. | : 8,082,966 B2 | |
| APPLICATION NO. | : 12/723312 | |
| DATED | : December 27, 2011 | |
| INVENTOR(S) | : Short | |

It is certified that error appears in the above-identified patent and that said Letters Patent is hereby corrected as shown below:

IN THE SPECIFICATIONS:

Column 3, lines 6-7, "wherein the mounting place further includes" should read --wherein the mounting plate further includes--

Column 3, lines 26-27, "wherein the mounting place further includes" should read --wherein the mounting plate further includes--

Column 3, line 46, "wherein the mounting place further includes" should read --wherein the mounting plate further includes--

IN THE CLAIMS:

Column 7, lines 47-48, claim 1, "wherein the mounting place further includes" should read --wherein the mounting plate further includes--

Column 8, lines 21-22, claim 8, "wherein the mounting place further includes" should read --wherein the mounting plate further includes--

Column 8, lines 63-64, claim 15, "wherein the mounting place further includes" should read --wherein the mounting plate further includes--

Signed and Sealed this
Thirteenth Day of March, 2012

David J. Kappos
*Director of the United States Patent and Trademark Office*